United States Patent [19]

Gage

[11] Patent Number: 5,347,297

[45] Date of Patent: Sep. 13, 1994

[54] APPARATUS AND METHOD FOR OPTIMIZING PERFORMANCE IN AN OPTICAL STORAGE SYSTEM READ/WRITE HEAD

[75] Inventor: Edward C. Gage, Rochester, N.Y.

[73] Assignee: Eastman Kodak Company, Rochester, N.Y.

[21] Appl. No.: 806,407

[22] Filed: Dec. 13, 1991

[51] Int. Cl.⁵ .......................... H04N 1/21; B41J 2/435
[52] U.S. Cl. ...................................... 346/108; 358/296
[58] Field of Search ..................... 346/1.1, 108, 107 R, 346/76 L, 160; 358/296, 300, 302

[56] References Cited

U.S. PATENT DOCUMENTS

| | | | |
|---|---|---|---|
| 3,694,053 | 9/1972 | Kahn | 350/150 |
| 4,560,999 | 12/1985 | Tokuhara | 346/160 |
| 4,566,758 | 1/1986 | Bos | 350/346 |
| 4,774,615 | 9/1988 | Revelli et al. | 360/114 |
| 5,150,228 | 9/1992 | Liu et al. | 359/7 |

Primary Examiner—Mark J. Reinhart
Attorney, Agent, or Firm—Raymond L. Owens

[57] ABSTRACT

A read/write head for an optical storage system is implemented using at least one liquid crystal cell, the liquid crystal cell being of the type in which the retardance of a radiation beam therethrough is determined by an externally applied voltage. In an optical storage system of the type having regions of differing absorption to determine logic states the liquid crystal cell can activated by a voltage which provides the liquid crystal cell with the characteristics of a quarter wave plate. In this configuration, the liquid crystal cell is positioned in the collimated beam between the linearizing beam splitter and the storage medium. In the optical storage system in which logic states are identified with the orientation of magnetic regions, the liquid crystal cell is positioned between the linearizing beam splitter and the beam splitter used to separate the radiation components. When two liquid crystal cells with controllable retardance are included in read/write head, a read/write head which can be used in either type of optical storage system can be provided. The use of the adjustable retardance liquid crystal cells permits both an optimization of the read/write head, but permits adjustment to compensate for changes in the optical properties.

12 Claims, 3 Drawing Sheets

APPARATUS AND METHOD FOR OPTIMIZING PERFORMANCE IN AN OPTICAL STORAGE SYSTEM READ/WRITE HEAD

BACKGROUND OF THE INVENTION

1. Field of Invention

This invention relates generally to optical systems for the storage and retrieval of information and, more particularly, to the read/write head of the optical information storage system which directs radiation to the storage medium and then directs radiation resulting from the interaction with the medium to the radiation detectors.

2. Description of the Related Art

The optical storage systems, at present can generally be placed into one of two categories, the categories determined by the optical property used to identify different logical states on the storage medium. The first optical storage system can be referred to a differential absorption (or reflection) of a radiation beam impinging on the storage medium surface. In the differential absorption optical systems, each logical states are associated with changes in the intensity of a beam of radiation interacting with the storage medium. In the second category of optical storage systems, changes in the rotation of plane polarized beam of radiation are used to identify optical states. In either category, a multiplicity of encoding techniques can be used in the storage of the information on the storage medium.

Referring now to FIG. 1, an implementation of the differential absorption type of optical storage system, also referred to as a "write once erasable phase" change storage system, is shown. In particular, the read/write head of the optical storage system is used to determine a change in the absorption resulting from the interaction of radiation with the optical information storage medium 15. Radiation from a light source 10, typically a laser diode or light emitting diode, is collimated by lens 11. The resulting collimated light beam is passed through a polarization beam splitter 12, the beam splitter 12 positioned and oriented to pass only light having predetermined linear polarization. The linearly polarized beam is transmitted through the quarter wave plate 13. With the proper orientation of the quarter wave plate 13, the radiation beam is changed to a nearly circularly polarized state. The circularly polarized radiation beam can be considered to comprised of two components having a left hand oriented or right hand oriented component. The radiation beam is then focused by objective lens 14 on a predetermined location of storage medium 15. The storage medium 15 can be a rotating disc with storage material having at least two states of absorption. The two states of absorption will provide a detectable difference in the intensity of the radiation beam applied thereto. The radiation reflected from the storage medium 15 is recollimated by lens 14. The recollimated radiation, for which the orientation of the circular polarization is reversed by the reflection from the storage material and passage through the objective lens, is transmitted through the quarter wave plate 13 once again. The second passage of the radiation through the quarter wave plate converts the circularly polarized radiation state to a state of linear polarization of the radiation which is orthogonal relative to the linear polarization of the original radiation beam. The resulting radiation beam is applied to beam splitter 12. The polarization of the reflected radiation beam, having been rotated by 90° by the media reflection and the double passage through the quarter wave plate, the reflected radiation beam will be reflected, rather than transmitted, by the beam splitter 12. The reflected radiation from the beam splitter 12 is applied to detector 18. The detector 18 responds to the magnitude of the detected radiation beam. The output signal from the photodetector 18 is a function of the amplitude of the beam reflected from the storage medium and is therefore a measure of the reflectivity of the local region upon which the radiation beam is focused. The signal from detector 18 is amplified by amplifier 20. Because there is a correlation between the local regions of controlled reflectivity with absorption, the output signal of the detector 18 identifies the reflectivity of a (currently addressed) region of the storage medium having the radiation beam applied thereto. By applying the radiation beam to localized regions of the storage medium in a manner consistent with the geometry of the information stored thereon, retrieval of information can be performed on the storage medium.

Referring to FIG. 2, the implementation of the read/write head in an optical information storage system relying on differential rotation of the planar polarization of a optical radiation caused by the interaction of the optical radiation with the storage surface is shown. This type of storage system, also known as a magneto-optical storage system, relies on the Kerr effect wherein the rotation of a plane of polarization is different when a magnetic material has a magnetic orientation parallel to or a magnetic orientation anti-parallel to the direction of the radiation interacting with the magnetic material, i.e., the differential change in polarization of a reflected beam depends upon the orientation of the magnetization of the local domain with which the radiation interacts. As with the implementation for detecting a change in reflected light amplitude, the radiation from a light source 10 is collimated by lens 11 and one plane of polarization is selected by passing the collimated beam through the partial beam splitter 12'. Because linearly polarized radiation can be considered to be comprised of two circularly polarized radiation components, the interaction with the magnetic layer forming a portion of storage medium 15 effects the two circularly polarized components differently. As a result, after interaction with the storage material, the reflected radiation is not linearly polarized parallel to the applied radiation, but an elliptical polarization of the reflected radiation results in a rotation of the reflected linear polarization due to the circular dichroism and the circular birefringence of the storage media. The reflected radiation is recollimated by objective lens 14. The recollimated beam is applied to beam splitter 12' and the components of the radiation beam orthogonal to the plane of polarization of the radiation impinging on storage medium, i.e., the components induced by the interaction, are reflected by the beam splitter 12. Some of the light with polarization parallel to the impinging radiation can also be reflected from the magneto-optic region. The radiation reflected by the beam splitter 12' is transmitted through retardation plate 16 to correct to ellipticity introduced into the radiation beam. The polarization beam splitter 17 divides the radiation reflected from beam splitter 12' into radiation components which have been rotated by the interaction with the storage material. Each detector 18 and 19 receives a component resulting from one orientation of the magnetic regions of the storage medium interacting with the impinging radiation beam. The differential amplifier 20' is used to enhance the detectability of the small signals, the rotation due to the Kerr effect typically being less than 2° relative to reflected radiation which had not been subjected to differential interaction of the circularly polarized components with the optical storage material and to cancel the large DC component of the two radiation components.

The foregoing implementations of read/write heads have the problem that the retardation plates must be provided which are specific to the parameters of the device. For example, the quarter wave plate 13 (in FIG. 1) and the retardation plate 16 (in FIG. 2) both depend on the radiation emitted by the radiation source 10. The radiation source 10, e.g., a light emitting diode, can have aging effects which cause the wavelength of the emitted radiation to vary. A need has therefore been felt for a read/write head for optical storage devices which can be adjusted as conditions change and to compensate for variations in the media and for variation in the properties of the optical components. In addition, a need has been felt for a read/write head which can be adapted to either the differential absorption or the differential polarization device.

SUMMARY OF THE INVENTION

The present invention is directed to overcoming one or more of the problems set forth above. Briefly summarized, according to one aspect of the present invention, the wavelength dependent elements used in the optical read/write head of an optical storage system, such as retardation plates and quarter wave plates, are replaced by a liquid crystal cell that provide a retardance which is a function of applied voltage. Because the retardance is a function of voltage, an adjustment capability can be provided for the liquid crystal cell and compensation for changes in optical head parameters can be implemented by adjusting the voltage. Because the optical storage media are typically removable, compensation for variations in the storage media can be provided. In addition, the components of the read/write head can be fabricated in a standard configuration which is suitable for both optical storage heads based both on the differential absorption and based on the differential change in the plane of polarization. In either implementation, the capability to control the optical parameters of the head permits optimization of the head performance.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

Detailed Description of the Figures

Figure 2:
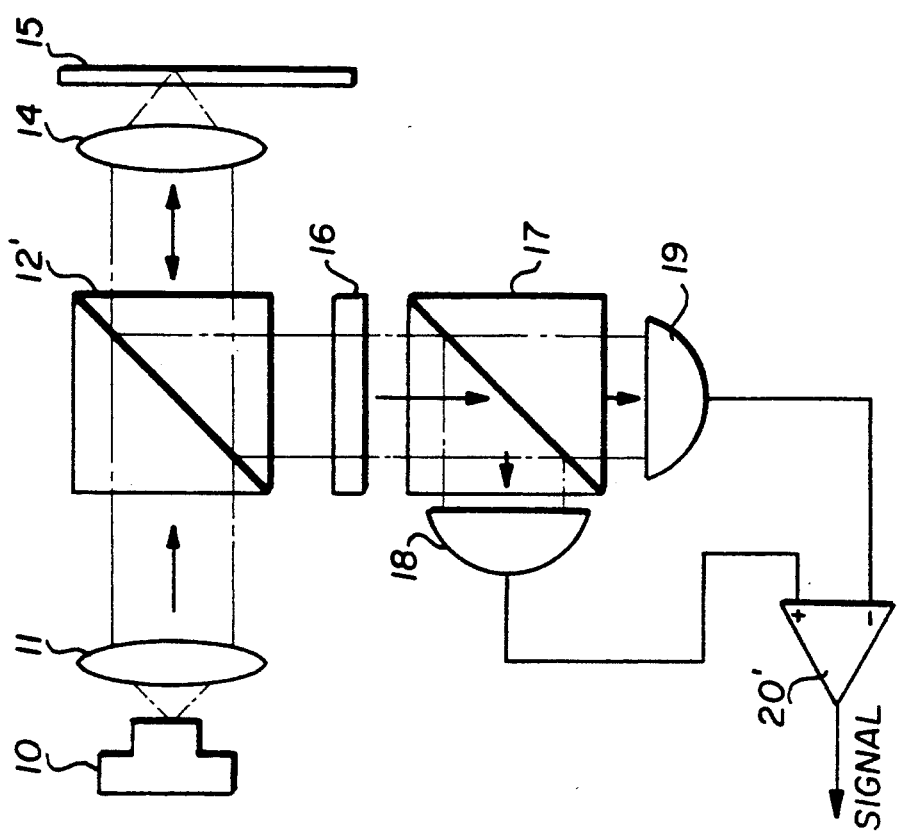
FIG. 2 is a block diagram of a prior art read/write head for an optical system used in detecting difference in plane of polarization of a radiation beam resulting from interaction with a magnetically active storage medium.
Figure 1:
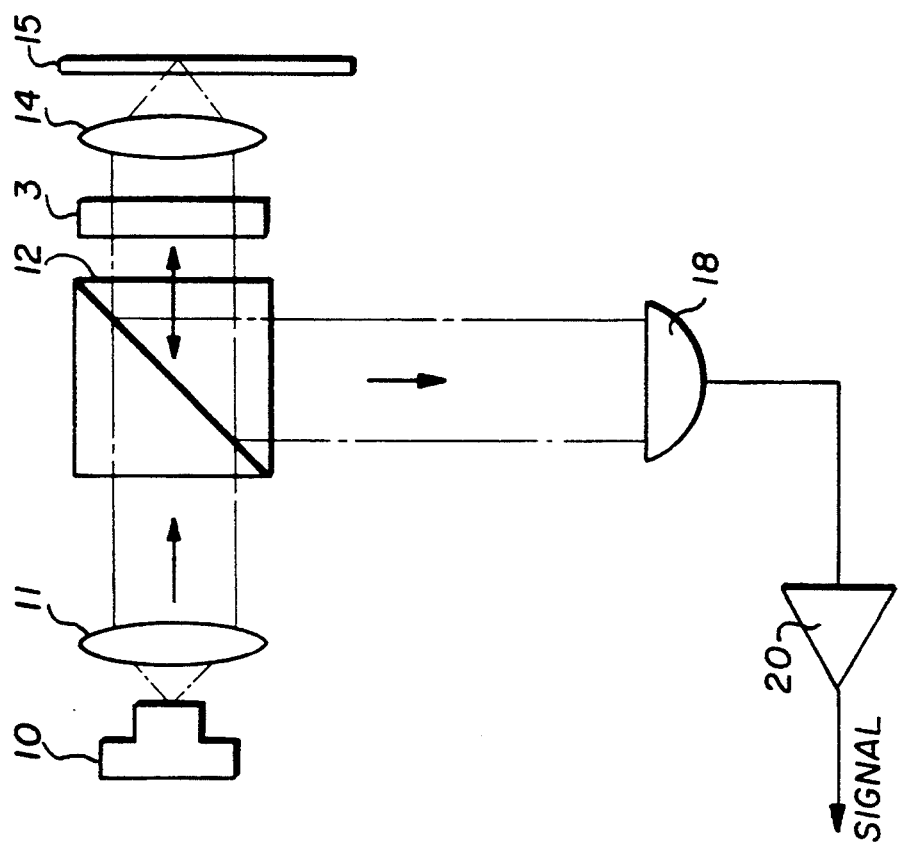
FIG. 1 is a block diagram of a prior art read/write head for an optical system used in detecting the differential absorption of regions on the storage medium.

FIG. 1 and 2 have been discussed in relationship to the prior art.

Figure 3:
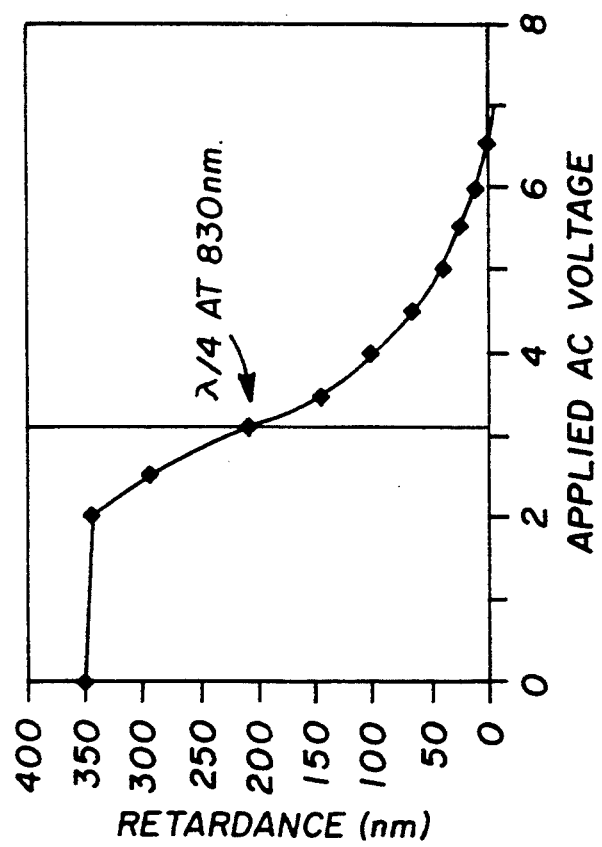
FIG. 3 is a plot of the retardance versus voltage for a liquid crystal cell of the type used in the present invention.

Referring next to FIG. 3, a graph of a variable retardance liquid crystal cell as a function of voltage is shown. The retardance (resulting from the birefringence), is shown in nanometers, is plotted as a function of applied peak-to-peak square wave voltage for a radiation wavelength of 830 n(ano)m(eters). Also shown in FIG. 3 is the voltage at which the liquid crystal cell is a quarter-wave plate for the applied radiation having the wavelength of 830 nm. The liquid crystal cell has a nematic material enclosed therein. The excitation voltage for the liquid crystal cell is a high frequency AC voltage. The use of AC excitation voltage reduces the material deterioration that is the result of DC excitation voltage. When the excitation frequency is sufficiently high, the inertial effects of the material prevent any disorientation resulting from the changing excitation voltage.

Figure 4:
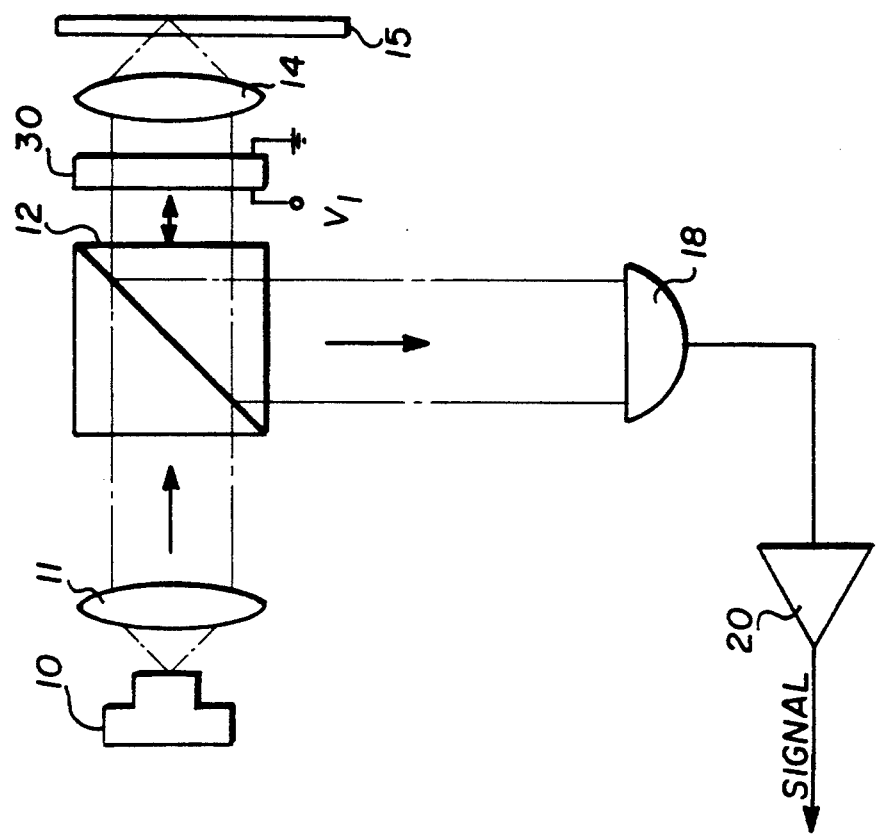
FIG. 4 is a diagram of a read/write head used in detection of a differential absorption resulting from interaction of a radiation beam with two types of regions in a storage medium.

Referring next to FIG. 4, the read/write head for detecting the change in the absorption of a radiation beam resulting from the interaction of the storage beam with the storage material according to the present invention is shown. The head is arranged in a manner similar to FIG. 1. The radiation from the radiation source 10 is collimated by means of lens 11 and the polarization established by means of beam splitter 12. The polarized radiation beam is transmitted through the variable retardance liquid crystal cell 30, the voltage $V_1$ applied to the liquid crystal cell is selected to provide a retardance of 90°. The liquid crystal cell is oriented with its fast axis at an angle of 45° relative to the linear polarization. The polarized radiation is focused on the storage medium 15 by objective lens 14, and the reflected radiation, recollimated by lens 14, is transmitted through the liquid crystal cell 30 and applied to the beam splitter 12. The light reflected from beam splitter 12 is applied to detector 18. Using the liquid crystal cell 30, the optical feedback can be minimized and the signal maximized.

Figure 5:
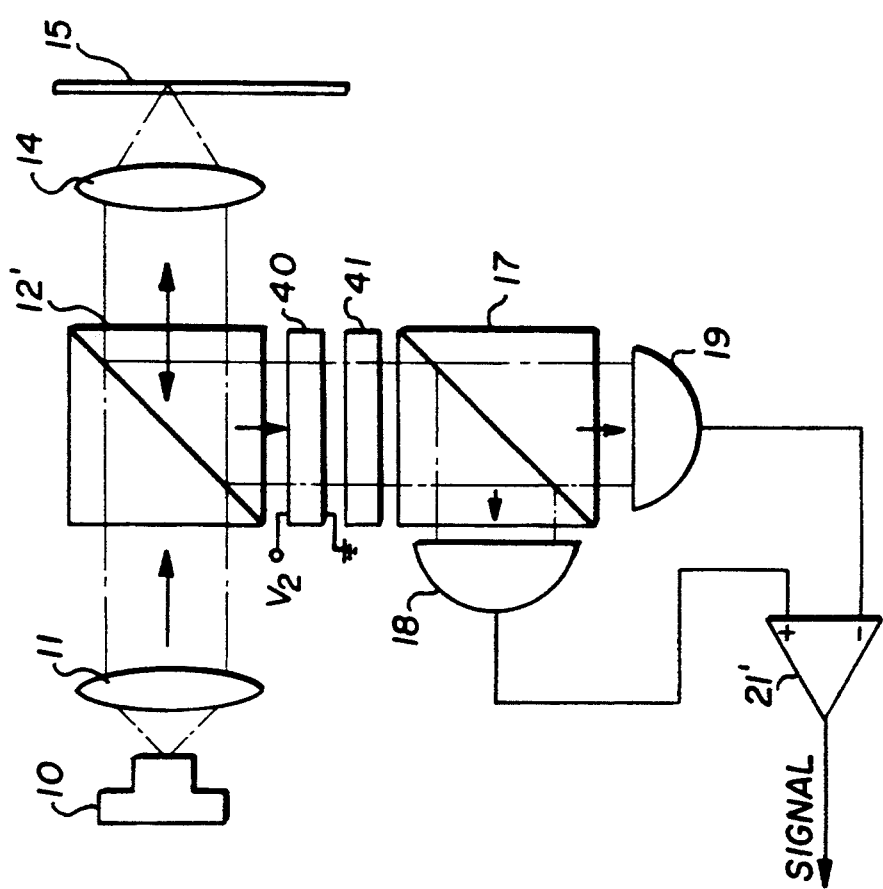
FIG. 5 is a diagram of a read/write head used in the detection of a difference in the plane of polarization of a radiation beam interacting with two different types of regions in a storage medium according to the present invention.

Referring to FIG. 5, the read/write head of an optical storage system of the type which detects the difference in the plane of polarization of linearly polarized light interacting with a storage medium is shown. As in the prior art device described with respect to FIG. 2, the radiation from radiation source 10 is collimated by lens 11 and transmitted through partial beam splitter 12'. The polarized radiation from beam splitter 12' is focused by means of condensing lens 14 on the storage medium 15. The radiation reflected from storage medium 15 is passed through beam splitter 12' and the radiation rotated by the storage medium is applied to through the variable retardance liquid crystal cell 40 and through half wave plate 41 to the beam splitter 17. The liquid crystal cell has a retardance determined by applied voltage $V_2$ and is aligned with its fast axis parallel to p-axis of beam splitter 12'. The two components of the reflected radiation are separated by beam splitter 17 and applied to detector 18 and detector 19, respectively. The half-wave plate 41 balances the signal on the two detectors. Alternatively, the assembly 17, 18, and 19 could be rotated with respect to the input beam. The difference in amplitude between the two components can identify the orientation of the magnetic state of the storage medium. The voltage applied to the variable retardance liquid crystal cell 40 is set to compensate for the ellipticity introduced into the radiation beam components by the interaction with the storage material and components in the read write/head.

Figure 6:
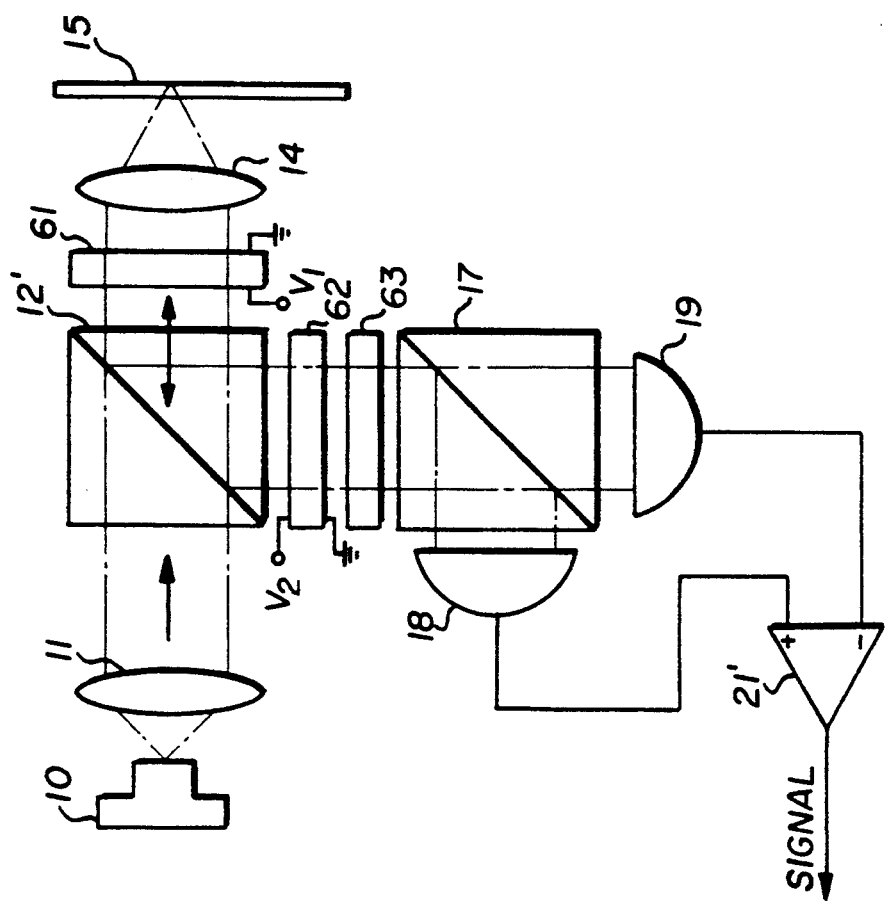
FIG. 6 is a block diagram of a read/write head that can be used in both the differential absorption type and differential plane of rotation type of optical storage system.

Referring to FIG. 6, a universal optical read/write head, i.e., a head which can be in either differential absorption type storage systems or in differential linear rotation storage systems, is shown. The radiation is provided by a radiation source 10. The radiation is collimated by collimating lens 11 and polarized by passage through the partial beam splitter 12'. The linearly polarized radiation is passed through the variable retardance liquid crystal cell 61. The radiation beam is the transmitted through the condensing lens 14 and applied to the storage medium 15. The reflected light is recollimated by the condensing lens 14, transmitted through the variable retardance liquid crystal cell 61 having voltage $V_1$ applied thereacross and transmitted through the beam splitter 12'. The radiation reflected from the beam splitter 12 is transmitted through the variable retardance liquid crystal cell 62 having voltage $V_2$ applied thereacross, through half wave plate 63, and applied to beam splitter 17. A part of the signal radiation is applied to detector 18 and a part of the signal radiation is applied to detector 19. The output signals from detector 18 and detector 19 are combined in differential or summing amplifier 21.

Operation of the Preferred Embodiment

The operation of the variable retardance liquid crystal cell provides an improvement in the operation of the read/write heads because, not only can the read/write heads be optimized for the present physical parameters of the device, such as the wave length of the light source and/or for variations in the storage media itself. As the parameters change, the controllable liquid crystal cells can be adjusted to compensate for the parameter changes.

In an optical head used in the differential absorption storage systems, the variable retardance liquid crystal cell 61 is adjusted, to act as a quarter wave plate. As the parameters of the read/write head change, e.g., through aging, the voltage of the variable retardance liquid crystal cell(9) can be adjusted to optimize the signal-to-noise ratio. By way of example, the light source in an optical read/write head is typically a laser diode. The frequency of the radiation from the diode will typically change with the passage of time and the controllable liquid crystal cell can be used to compensate for the changes.

With reference to either the write once system of the magneto-optic system, in the storage of information on optical recording element, a relatively thick layer (e.g., 1 to 2 millimeters) of transparent plastic (e.g., polycarbonate) is used to support the medium upon which the storage of information is performed. Plastic material is preferred for this application because high quality optical disks can be fabricated using the techniques of injection molding. However, the conventional process of injection molding can result in stress induced birefringence of optical beams transmitted therethrough. The birefringence can change the state of the polarization (both angle and ellipticity) of a beam reflected from the information storing medium. In order to correct for the birefringence, an error signal can be determined from the output signal in a manner described in U.S. Pat. No. 4,774,615, the patent being issued to Revelli et al. and assigned to the assignee of the present application. The error signal can be used to control the voltage $V_1$ applied to the variable retardance liquid crystal cell 61.

It will be now appreciated that there has been presented a description of read/write heads for optical storage systems which can provide improved performance. The improved performance is the result of the use of liquid crystal cells for which the retardance can the controlled. The controlled retardance permits the performance of the read/write head to be optimized and permits periodic readjustment to compensate for the effects of aging in the cells.

The use of variable retardance liquid crystal cells can be used to provide a 'universal' read/write head, i.e., a single read/write head such as is shown in FIG. 6 which can be adapted for use in either the variable absorption type optical storage unit or the differential rotation of linear polarization type optical storage system. Not only does the universal type read/write head permit the a standard manufacturing process for optical read write heads for both types of optical storage system, but by changing the voltages, the storage media, i.e., disks of either type storage system can be read. Referring to FIG. 6 again, the differential absorption configuration is achieved when:

Liquid crystal cell 61 is a quarter wave plate and liquid crystal cell 62 is set for zero wave. The signal identifying the optical state of the illuminated region of the storage medium is the signal from detector 17 plus the signal from detector 18.

The read/write head can be configured for the differential linear optical rotation storage system when, in FIG. 6:

Liquid crystal cell 61 is set for zero wave and the liquid crystal cell 62 is set to compensate for the ellipticity of the reflected signal. The signal identifying the optical state of the illuminated region is the signal from detector 17 minus the signal from detector 18.

The use of the liquid crystal cells permits adjustment of the parameters of the optical path resulting in an enhancement of the detectability of the optical state of the storage medium.

While the invention has been described with reference to the read/write heads of optical storage systems, it is apparent that the invention is easily adapted to other devices that require the ability to control the retardance of a radiation beam and, in particular, to control the rotation of plane polarized radiation beams either to optimize performance or to adjust for aging effects of optical circuit parameters. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. By way of specific example, the detectors 18 and 19 typically have masks or similar structure providing a plurality of signals derived from the reflected radiation beam. These signals are part of a feedback loop (not shown) which includes a mechanical device, the feedback loop used to maintain the radiation applied to the storage media in focus and to provide a tracking of the path upon which the data is stored. By way of further example, the magneto-optical configuration of the read/write head uses a partial polarization beam splitter. The partial polarization beam splitter permits additional radiation to be applied to the detectors and permits the signal being detected to be substantially greater than the detector dark current.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A read/write head for optical storage systems using either differential absorption of an optical beam mechanism or differential rotation of linear polarization mechanism of an optical beam to identify regions on an optical storage medium, said read/write head comprising:

a source of radiation for providing a radiation beam;
a lens for providing a collimated radiation beam when said radiation beam is passed therethrough;
a first beam splitter having said collimated radiation beam applied thereto, said first beam splitter providing a linearly polarized radiation beam;
a first liquid crystal cell through which said polarized radiation beam is transmitted, said first liquid crystal cell providing a retardance for said linearly polarized radiation beam resulting in a circularly polarized radiation beam when a first voltage is applied to said first liquid cell;
a second lens focussing said circularly polarized radiation beam transmitted by said first liquid crystal cell on said storage medium, wherein said second lens results in a reflected recollimated radiation beam for radiation reflected by said optical storage medium, said recollimated radiation beam being transmitted through said first liquid crystal cell and said first beam splitter, wherein transmission through said first liquid crystal cell results in a linearly polarized radiation beam having a signal radiation component with a polarization perpendicular to a polarization of said polarized radiation beam, wherein said first beam splitter reflects a signal radiation beam;
a second liquid crystal cell and a half wave plate through which said reflected signal radiation beam is transmitted to provide a final radiation beam, said second liquid crystal cell providing a retardance of said signal radiation beam which is a function of a second voltage applied to said second liquid crystal cell;
a second beam splitter for receiving said final radiation beam, said second beam splitter dividing said final radiation beam into a transmitted signal beam and a reflected signal beam; and a first and a second radiation detector, said first radiation detector providing a first signal in response to said transmitted signal beam, said second detector providing a second signal in response to said reflected signal beam, wherein a comparison of said first and said second signals differentiates between storage regions on said optical storage medium.

2. The read/write head of claim 1 wherein said first liquid crystal cell has a first voltage applied thereto providing a 90 degree retardance resulting in circularly polarized radiation beam transmitted therethrough, said second liquid crystal cell having a second voltage applied thereto providing zero retardance of a radiation beam transmitted therethrough, said read/write head being capable of identifying regions of differing absorption characteristics on said storage medium.

3. The read/write head of claim 1 wherein said first liquid crystal cell has a first voltage applied thereto providing substantially zero retardance of a radiation beam passing through said first liquid crystal cell, said second liquid crystal cell having voltage applied thereto providing substantial elimination of ellipticity of said signal radiation beam, said read/write head being adapted for identifying regions of said storage medium having different magnetic orientations.

4. The read/write head wherein said first liquid crystal cell has a voltage applied thereto correcting effects resulting from birefringence of said optical storage medium.

5. A read/write head for use in identifying properties of an optical storage medium in an optical storage system, said read/write head capable of being adjusted to maximize performance and to respond to changes in optical parameters, said read/write head comprising:

a radiation source for providing a collimated radiation beam;
a beam splitter for providing a linearly polarized beam when said radiation beam is transmitted therethrough;
a variable retardance liquid crystal cell having said linearly polarized beam transmitted therethrough, transmission of said linearly polarized beam through said variable retardance liquid crystal cell resulting in an elliptically polarized radiation beam, an ellipticity of said elliptically polarized beam determined by a voltage applied to said liquid crystal cell;
a lens for focusing said elliptically polarized beam on said optical storage medium and for recollimating a reflected elliptically polarized radiation beam reflected from said optical storage medium storage medium, wherein said reflected elliptically polarized radiation beam transmitted through said liquid crystal cell forms a linearly polarized reflected radiation beam, said reflected linearly polarized radiation beam being applied to said beam splitter, a signal radiation beam having a component orthogonal to said linearly polarized radiation beam being reflected by said beam splitter; and
a radiation detector responsive to said signal radiation beam for determining from which of two types of regions of said optical radiation storage medium said reflected radiation beam is reflected.

6. The read/write head of claim 5 wherein said variable retardation liquid crystal cell provides a retardance of 90°, a fast axis of said liquid crystal cell being oriented at 45° to a linear polarization of said radiation beam, said liquid crystal cell providing a circularly polarized radiation beam as a result of transmission of linearly polarized radiation therethrough.

7. The read/write head of claim 6 further comprising:
a second beam splitter positioned between said beam splitter and said detector;
a second detector positioned to detect radiation reflected from said second beam splitter; and
a second variable retardance liquid crystal cell positioned between said beam splitter and said second beam splitter, wherein voltages applied to said variable retardance liquid crystal cell and said second variable retardance liquid crystal cell determine which optical storage media property changes can be identified by of said electrical signals from said first detector and said second detector.

8. The read/write head of claim 7 further comprising a half wave plate positioned between said second variable retardance liquid crystal cell and said second beam splitter.

9. A read/write head for use in identifying a difference in the optical properties of two types of regions of a storage medium of an optical storage system, said read/write head capable of being adjusted for optimum performance and to respond to changing optical parameters, said read/write head comprising:
a radiation source for providing a collimated radiation beam;
a beam splitter providing a linearly polarized radiation beam when said collimated radiation beam is transmitted therethrough;
a lens for focusing said collimated radiation beam on said storage medium and for recollimating reflected radiation, wherein reflected radiation resulting from focusing said collimated radiation on said optical storage medium is applied to said beam splitter, said beam splitter reflecting a signal radiation beam of said recollimated reflected radiation beam, said signal radiation beam being orthogonal to said linearly polarized radiation beam;
a variable retardance liquid crystal cell for providing retardance for said reflected signal radiation beam, said retardance being determined by a voltage applied to said liquid crystal cell, said voltage selected to substantially minimize ellipticity of said reflected signal radiation beam;
a second beam splitter positioned to reflect a first signal portion and to transmit a second signal portion of said signal radiation beam; and
a first radiation detector and a second radiation detector, said first radiation detector providing first electrical signal in response to said first signal portion, said second detector providing a second electrical signal in response to second signal portion, wherein a comparison of said first and said second electrical signals identifies a magnetic orientation of a region of said storage medium upon which said polarized radiation beam is focused.

10. The read/write head of claim 9 wherein an orientation of said second beam splitter relative to a polarization of said reflected signal radiation beam generally equalizes said first and said second electrical signals resulting from detection of said first and said second signal portions.

11. The read/write head of claim 9 further comprising a half or quarter wave plate between said liquid crystal cell and said second beam splitter, said quarter wave balancing said first and said second portions of said signal radiation beam.

12. The read/write head of claim 11 further comprising a second variable retardance liquid crystal cell positioned between said beam splitter and said lens, wherein selection of voltages applied to said variable retardance liquid crystal cell and said second variable retardance liquid crystal cell determines optical properties of said optical storage media which can be identified by said read/write head.

* * * * *